(12) United States Patent
Nishimura

(10) Patent No.: US 9,662,727 B2
(45) Date of Patent: May 30, 2017

(54) MACHINE TOOL FOR THREADING PROCESSES

(71) Applicant: OKUMA CORPORATION, Niwa-Gun (JP)

(72) Inventor: Kohei Nishimura, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 430 days.

(21) Appl. No.: 14/052,018

(22) Filed: Oct. 11, 2013

(65) Prior Publication Data
US 2014/0121816 A1 May 1, 2014

(30) Foreign Application Priority Data
Oct. 30, 2012 (JP) ................... 2012-239393

(51) Int. Cl.
B23G 1/04 (2006.01)
B23G 3/00 (2006.01)

(52) U.S. Cl.
CPC ........... *B23G 1/04* (2013.01); *B23G 3/00* (2013.01); *G05B 2219/49392* (2013.01)

(58) Field of Classification Search
CPC . G05B 19/408; G05B 19/4097; G05B 19/414
USPC ....................................................... 700/159
See application file for complete search history.

(56) References Cited

U.S. PATENT DOCUMENTS

| | | | |
|---|---|---|---|
| 4,386,407 A * | 5/1983 | Hungerford | ......... G05B 19/186 |
| | | | 318/621 |
| 5,144,871 A | 9/1992 | Niwa | |
| 6,847,857 B2 | 1/2005 | Sugie | |
| 7,241,083 B2 * | 7/2007 | Nada | ............... B23B 27/065 |
| | | | 407/113 |
| 2009/0110499 A1 | 4/2009 | Inagaki | |
| 2012/0097411 A1 | 4/2012 | Yoshino et al. | |
| 2013/0046405 A1 | 2/2013 | Shamoto | |

FOREIGN PATENT DOCUMENTS

| | | |
|---|---|---|
| CN | 101417398 A | 4/2009 |
| JP | 2004-209558 | 7/2004 |
| JP | 2009-136956 A | 6/2009 |
| JP | 2009-214218 A | 9/2009 |
| JP | 2011-206894 A | 10/2011 |
| JP | 2012-121107 | 6/2012 |

OTHER PUBLICATIONS

Inobe, K., et al. "Chatter Control in Screw Thread Turning by Spindle Speed Variation," *Transactions of the Japan Society of Mechanical Engineers*, (Series C), vol. 70, No. 693, pp. 1529-1534 (2004) (6 pages).
Japanese Office Action (with English Translation), Japanese Application No. 2012-239362, dated Feb. 17, 2016 (6 pages).
Chinese Office Action (Application No. 201310520511.1) dated May 4, 2016.

* cited by examiner

*Primary Examiner* — Darrin Dunn
*Assistant Examiner* — Jigneshkumar Patel
(74) *Attorney, Agent, or Firm* — Burr & Brown, PLLC

(57) ABSTRACT

A machine tool includes a first-pass rotation speed computing section. The first-pass rotation speed computing section automatically decides whether the main spindle rotation speed in the first pass should be a high rotation speed or a low rotation speed so that cutting in the last tool pass is performed at the high rotation speed. Thus, cutting of the last tool pass at the low rotation speed can be reliably prevented.

3 Claims, 8 Drawing Sheets

MACHINE TOOL FOR THREADING PROCESSES

CROSS REFERENCE TO RELATED APPLICATION

This application claims the benefit of Japanese Patent Application Number 2012-239393 filed on Oct. 30, 2012, the entirety of which is incorporated by reference.

BACKGROUND OF THE INVENTION

Field of the Invention

The present invention relates to machine tools such as lathes capable of performing, e.g., a threading process.

Description of Related Art

When machining is performed with a machine tool (in particular, machining of a workpiece with low rigidity or machining using a tool with low rigidity), strong vibrations known as chatter vibrations are often generated during machining. Such chatter vibrations cause problems such as a so-called chatter mark on the cutting surface, chipping of the tool, etc. As a solution to such problems, a technique has been devised which suppresses the chatter vibrations by changing the main spindle rotation speed during a threading cycle, as disclosed in, e.g., Japanese Patent Application Publication No. 2004-209558 (JP 2004-209558 A).

However, it is known from experiences that in the case of alternately performing cutting at a low rotation speed and cutting at a high rotation speed as in the above related art, cutting at the high rotation speed is less likely to cause chatter vibrations. Accordingly, if a specific tool pass that tends to cause chatter vibrations is known, it is desirable to perform cutting in this specific tool pass at the high rotation speed. In particular, in view of cutting surface accuracy, it is desirable to perform cutting in the last tool pass at the high rotation speed. However, in the case of changing the main spindle rotation speed in every plural passes, it is difficult to know whether the main spindle rotation speed of the first cutting at the start of machining should be the low rotation speed or the high rotation speed. Accordingly, cutting in the specific tool pass or the last tool pass may be performed at the low rotation speed, which may hinder effective suppression of chatter vibrations or degrade cutting surface accuracy. Prior to the present application, the applicant has devised a technique capable of suppressing an increase in cutting load. In the technique, the same run-out angle is used in all the passes when the main spindle rotation speed is changed on a pass basis during a threading cycle (Japanese Patent Application No. 2012-121107). The present invention has been developed in view of the technique.

SUMMARY OF THE INVENTION

It is an object of the present invention to provide a machine tool capable of reliably performing cutting in a specific tool pass at a high rotation speed.

In order to achieve the above object, a machine tool according to a first aspect of the present invention includes a holding device, a tool, a machining control unit, a rotation-speed control unit and a rotation-speed computing section. On the holding device, a shaft-shaped workpiece is mounted. The tool is capable of moving in radial and axial directions of the workpiece with respect to the workpiece. The machining control unit performs a threading process by repeating a tool pass in which the tool cuts the workpiece in the radial direction, moves in a direction parallel to an axis of the workpiece, and then moves away from the workpiece in the radial direction while the workpiece and the tool are relatively rotated about an axis of the workpiece. The rotation-speed control unit is capable of changing a rotation speed on a tool pass basis. The rotation-speed computing section computes a relative rotation speed between the workpiece and the tool in every tool pass. The rotation-speed control unit changes the rotation speed between a predetermined high rotation speed and a predetermined low rotation speed. The machine tool further includes a specific-rotation-speed computing section that decides whether the rotation speed in a first tool pass in the threading process should be the high rotation speed or the low rotation speed so that cutting in a specific tool pass is performed at the high rotation speed.

According to a second aspect of the present invention, in the first aspect of the present invention, the specific tool pass is a last tool pass in the threading process.

According to a third aspect of the present invention, in the first or second aspect of the present invention, the machining control unit is capable of performing the threading process in a plurality of types of cutting modes having different cutting methods of the tool, and a radial infeed mode, a flank infeed mode, and an alternate flank infeed mode are set as the cutting modes.

According to the present invention, the machine tool includes the specific-rotation-speed computing section that decides whether the rotation speed in a first tool pass in the threading process should be the high rotation speed or the low rotation speed so that cutting in a specific tool pass is performed at the high rotation speed. Accordingly, if, e.g., such a specific tool pass that tends to cause chatter vibrations is known, cutting in the specific tool pass can be easily performed at the high rotation speed, which further facilitates suppression of chatter vibrations.

According to the second aspect of the present invention, cutting in the last tool pass can be easily and reliably performed at the high rotation speed. This can reliably prevent problems due to cutting in the last tool pass at the low rotation speed, such as degradation in cutting surface accuracy.

DETAILED DESCRIPTION OF THE INVENTION

A machine tool according to an embodiment of the present invention will be described in detail with reference to the accompanying drawings.

Figure 1:
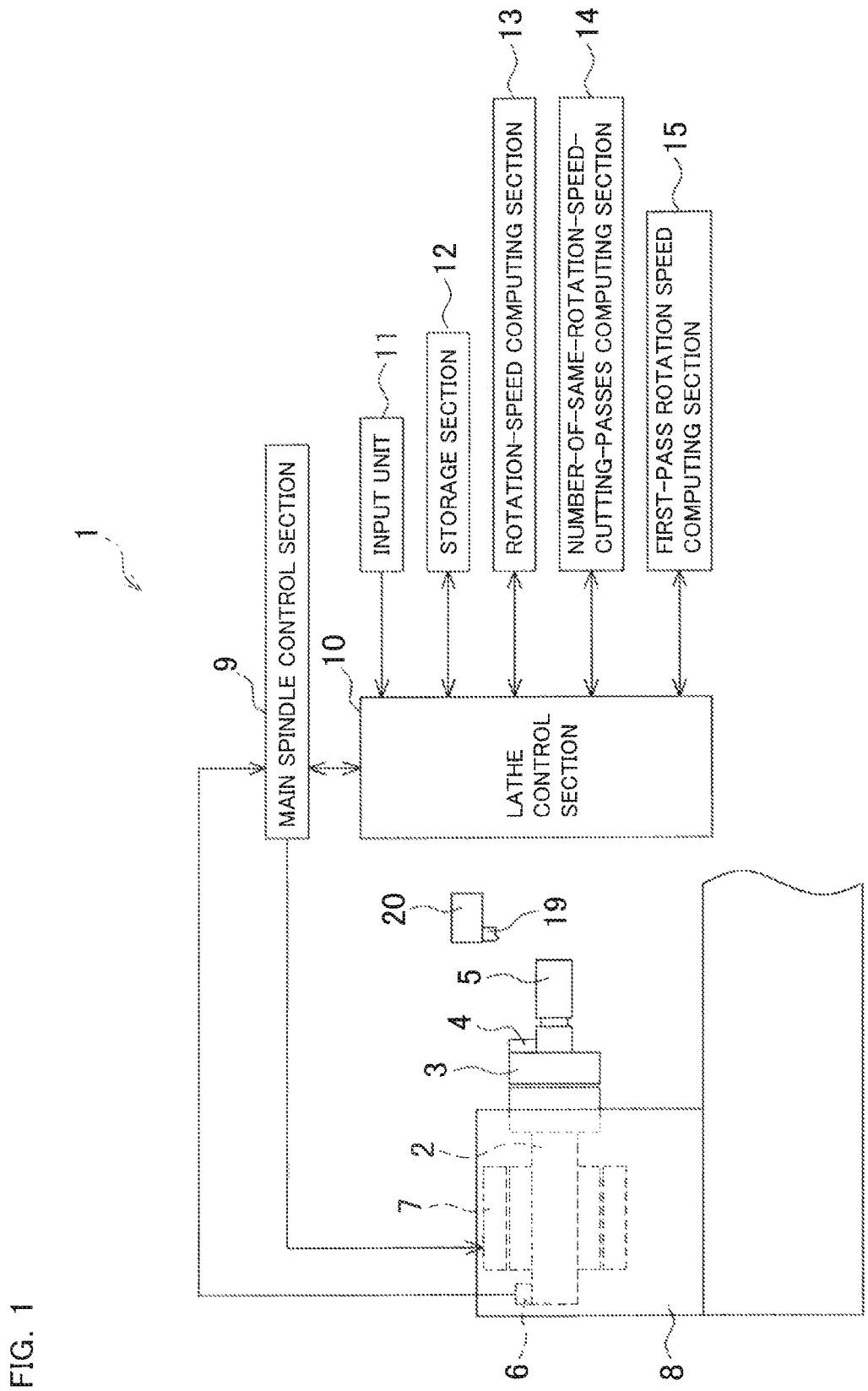
FIG. 1 is an illustration showing the overall configuration of a lathe.

First, the overall configuration of a lathe 1 will be described with reference to FIG. 1. The lathe 1 includes a chuck 3 having a pawl 4 at the distal end of a main spindle 2, and is capable of holding a shaft-shaped workpiece 5 by the chuck 3. A motor 7 that rotates the main spindle 2 and an encoder 6 that detects the rotation speed of the main spindle 2 are contained in a headstock 8 that supports the main spindle 2 such that the main spindle 2 rotates.

A main spindle control section 9 monitors the rotation speed of the main spindle 2 by the encoder 6 and controls the rotation speed of the main spindle 2. A lathe control section 10 controls the overall behavior of the lathe 1, and is connected to the main spindle control section 9, an input unit 11, a storage section 12, a rotation-speed computing section (hereinafter referred to as "a first computing section") 13, a number-of-same-rotation-speed-cutting-passes computing section (hereinafter referred to as "a second computing section") 14, and a first-pass rotation speed computing section (which is "the specific-rotation-speed computing section", and hereinafter referred to as "a third computing section") 15. The input unit 11 sets the cutting mode, and sends a command to change the main spindle rotation speed. The storage section 12 stores a machining program etc. The first computing section 13 computes the main spindle rotation speed. The second computing section 14 decides the number of same rotation speed cutting passes (i.e., the number of passes in which cutting is continuously performed at the same main spindle rotation speed). The third computing section 15 computes the main spindle rotation speed in the initial pass (first pass) so that cutting in the last tool pass is performed at a high rotation speed. The lathe 1 controls the rotation speed of the workpiece 5 (i.e., the main spindle rotation speed) via the main spindle control section 9. Further, the lathe 1 controls the machining operation such that a tool 19 cuts the peripheral surface of the rotating workpiece 5 and the workpiece 5 or the tool 19 is fed in the rotation axis direction and the radial direction, by using a well-known configuration.

Figure 2:
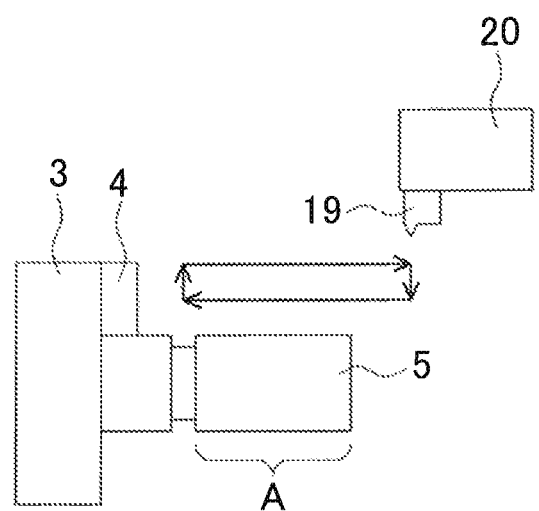
FIG. 2 is an illustration showing an example of a tool pass in a threading cycle using the lathe.

An example of a tool pass in a threading cycle as one machining form of the lathe 1 will be described with reference to FIG. 2.

The lathe 1 performs a threading process by repeating a cycle comprised of the following tool pass (shown by arrows in FIG. 2) a plurality of times according to the machining program stored in the storage section 12. In the tool pass, the motor 7 is supplied with electric power under the control of the main spindle control section 9 to rotate the main spindle 2 at a predetermined main spindle rotation speed, thereby the workpiece 5 rotates about the axis. Moreover, under the control of the lathe control section 10, the tool 19 fixed on a tool rest 20 cuts the workpiece 5 in the radial direction, and is fed in the longitudinal direction (the rotation axis direction) to machine a thread portion A, and then moves away from the workpiece 5 in the radial direction.

During the threading cycle machining with the lathe 1, the main spindle rotation speed is changed to a low speed or a high speed with a predetermined period. A manner in which the main spindle rotation speed is changed during the threading cycle machining will be briefly described below.

Figure 3:
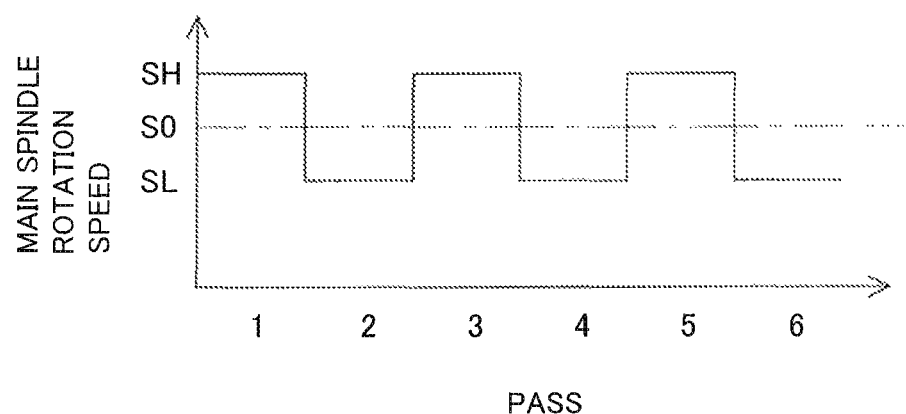
FIG. 3 is an illustration showing a manner in which the main spindle rotation is changed during a threading cycle.

S0 represents a reference rotation speed, and W represents a variation in main spindle rotation speed. These values S0, W are input in advance by the operator via the input unit 11. The first computing section 13 calculates a high rotation speed SH and a low rotation speed SL by using the following equations (1) based on these parameters, and the main spindle rotation speed is changed to either the high rotation speed SH or the low rotation speed SL in every pass (FIG. 3). This can suppress an increase in chatter vibrations as compared to the case where cutting is performed at a constant main spindle rotation speed in all of the passes.

$$SH = \left(1 + \frac{W}{200}\right)S0 \quad (1)$$
$$SL = \left(1 - \frac{W}{200}\right)S0$$

SH: high speed-side main spindle rotation speed [min$^{-1}$]
SL: low speed-side main spindle rotation speed [min$^{-1}$]
S0: reference rotation speed [min$^{-1}$]
W: variation in main spindle rotation speed [%]

Figure 4A:
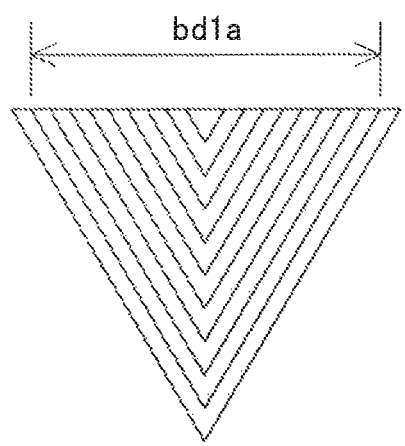
FIGS. 4A to 4C are illustrations showing paths of the tool and the width that is affected by the previous cutting surface in three types of cutting modes, namely a radial infeed mode, a flank infeed mode, and an alternate flank infeed mode, respectively.
Figure 4B:
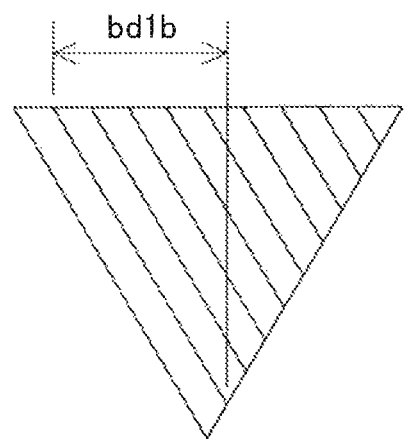
Figure 4C:
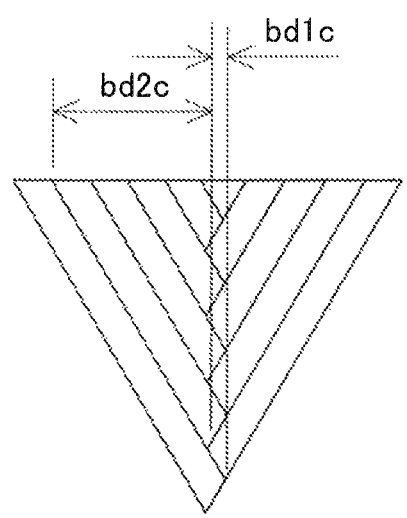

Decision of the number of same rotation speed cutting passes by the second computing section 14 will be described. Three types of cutting modes, namely a radial infeed mode, a flank infeed mode, and an alternate flank infeed mode, as an embodiment of the cutting mode (i.e., a cutting method of the tool passes) can be set in the lathe 1. FIGS. 4A to 4C are illustrations showing paths of the tool and the width that is affected by the previous cutting surface (hereinafter referred to as "regenerative width") in the three types of cutting modes, respectively.

The radial infeed mode shown in FIG. 4A is a cutting mode in which cutting is performed with cutting edges on both right and left sides (right and left sides in FIG. 2) of the blade tip of the tool 19. The smallest V-shaped surface in FIG. 4A corresponds to the path of the tool of the first pass. As the machining proceeds, the path of the tool gradually shifts to a larger V-shaped surface, and the largest V-shaped surface corresponds to the path of the tool of the 10th pass. Accordingly, in the radial infeed mode, cutting of the nth pass is affected only by the cutting surface of the (n−1)th pass. In the cutting of the 10th pass, the regenerative width of one pass before is bd1a in FIG. 4A.

The flank infeed mode shown in FIG. 4B is a cutting mode in which cutting is performed with the cutting edge on the left side of the blade tip of the tool 19. The rightmost small V-shaped surface in FIG. 4B corresponds to the path of the tool of the first pass. As the machining proceeds, the path of the tool gradually shifts to a V-shaped surface including a tilted surface toward the left side, and the large V-shaped surface including the leftmost tilted surface corresponds to the path of the tool of the 10th pass. Accordingly, in the flank infeed mode as well, cutting of the nth pass is affected only by the cutting surface of the (n−1)th pass. In the cutting of the 10th pass, the regenerative width of one pass before is bd1b in FIG. 4B.

The alternate flank infeed mode shown in FIG. 4C is a cutting mode in which cutting is performed by alternately using the right and left cutting edges of the tool 19 in every pass. The smallest V-shaped surface in FIG. 4C corresponds to the path of the tool of the first pass. As the machining proceeds, the path of the tool alternately shifts to a V-shaped surface including a right or left tilted surface. The V-shaped surface including the largest right and left tilted surfaces corresponds to the path of the tool of the 10th pass. Accordingly, in the alternate flank infeed mode, cutting of the nth pass is affected by the cutting surface of the (n−1)th pass and the cutting surface of the (n−2)th pass. In the cutting of the 10th pass, the regenerative width of one pass before is bd1c in FIG. 4C, and the regenerative width of two passes before is bd2c in FIG. 4C. In view of the relation between the regenerative width and chatter vibrations, the larger the regenerative width is, the more chatter vibrations are likely to be generated due to the influence of the previous cutting surface. In the alternate flank infeed mode, since the regenerative width of two passes before is larger than that of one pass before, chatter vibrations are likely to be generated due to the influence of the cutting surface of two passes before.

In view of the above, in the lathe 1, the second computing section 14 determines the cutting mode of the threading process based on the set machining program etc., and sets the number of same rotation speed cutting passes to "2" if the alternate flank infeed mode is set as the cutting mode, and sets the number of same rotation speed cutting passes to "1" if the radial infeed mode or the flank infeed mode (namely, any cutting mode other than the alternate flank infeed mode) is set as the cutting mode.

Figure 5:
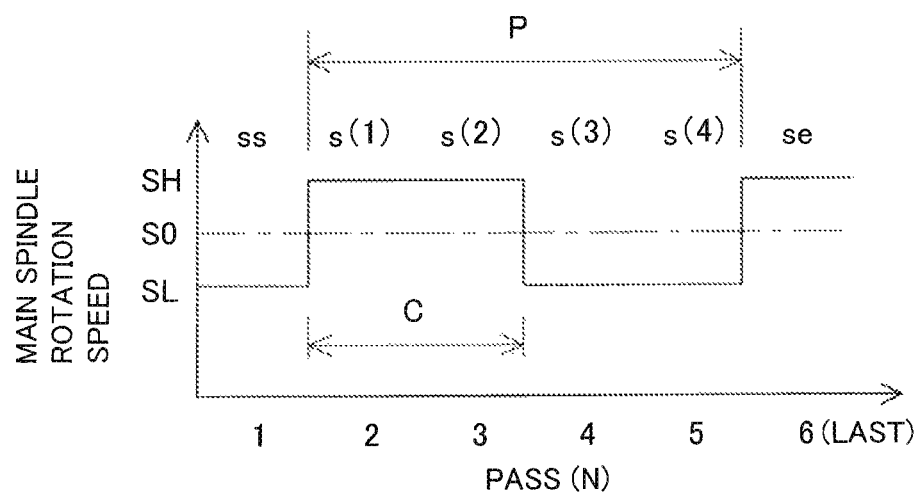
FIG. 5 is an illustration showing a manner in which the main spindle rotation speed is changed so that cutting in the last tool pass is performed at a high rotation speed.

Calculation of the main spindle rotation speed of the first pass by the third computing section 15 will be described. FIG. 5 is an illustration showing a manner in which the main spindle rotation speed is changed so that cutting in the last tool pass is performed at the high rotation speed.

In FIG. 5, C represents the number of same rotation speed cutting passes, and N represents the total number of cutting operations. In the machining shown in FIG. 5, C=2 and N=6. In FIG. 5, P represents the period with which the main spindle rotation speed is changed, (n) represents the order of cutting passes in the period P, and s(n) (n=1, 2, . . . , P) represents the main spindle rotation speed in the cutting pass in the period P. In this example, the main spindle 2 is rotated at the high rotation speed SH in s(1) to s(C), while the main spindle 2 is rotated at the low rotation speed SL in s(C+1) to s(P). In this case, the third computing section 15 calculates the main spindle rotation speed ss in the first pass by using the following equations (2) to (4). That is, the third computing section 15 decides whether the high rotation speed SH in s(1) to s(C) or the low rotation speed SL in s(C+1) to s(P) should be the main spindle rotation speed ss in the first pass.

$$P=2\times C \quad (2)$$

$$nm=(N-1)\bmod P \quad (3)$$

$$ss=s(P-nm+1) \quad (4)$$

The total number of cutting operations N can be calculated by dividing the total amount of cut by the amount of cut per pass.

The lathe 1 includes the second computing section 14 that decides the number of same rotation speed cutting passes. The second computing section 14 determines the cutting mode of the threading process based on the set machining program etc., and automatically decides an optimal number of same rotation speed cutting passes according to the cutting mode. Thus, even unskilled operators can easily suppress chatter vibrations, and can easily use the machine tool.

The lathe 1 includes the third computing section 15. The third computing section 15 automatically decides whether the main spindle rotation speed in the first pass should be the high rotation speed SH or the low rotation speed SL so that cutting of the last pass is performed at the high rotation speed. Therefore, cutting of the last tool pass at the low rotation speed can be reliably prevented.

The machine tool according to the present invention is not limited to the form of the above embodiment in any respects, and not only the overall configuration of the machine tool but also the manner in which the main spindle rotation speed is changed etc. can be appropriately modified as necessary without departing from the spirit and scope of the invention.

Figure 6:
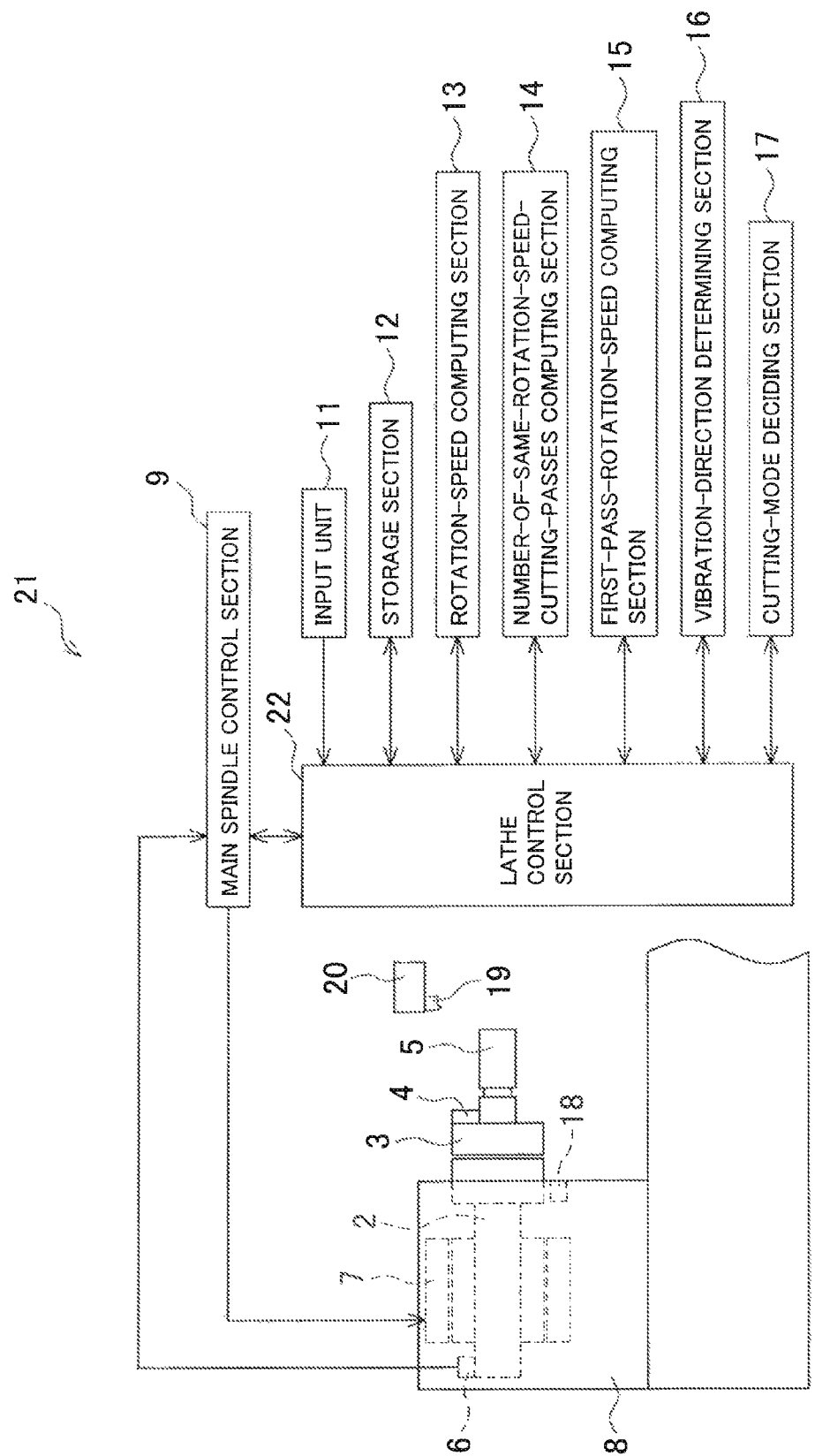
FIG. 6 is an illustration showing the overall configuration of a lathe according to a modified embodiment.

For example, although the cutting mode is manually set in the lathe 1 of the above embodiment, a cutting mode that is more likely to suppress vibrations may be automatically set in response to detection of vibrations generated on the main spindle. A lathe 21 according to such a modified embodiment will be described based on FIG. 6. In FIG. 6, the same components as those of the lathe 1 shown in FIG. 1 are denoted with the same reference characters.

The lathe 21 has a configuration similar to that of the lathe 1, but a vibration sensor 18 that detects vibrations generated on the main spindle 2 is contained near the main spindle 2 in the headstock 8. A vibration-direction determining section 16 and a cutting-mode deciding section 17 are connected to a lathe control section 22 that controls the overall behavior of the lathe 21. The vibration-direction determining section 16 determines the direction in which vibrations are more likely to be generated, according to the output of the vibration sensor 18. The cutting-mode deciding section 17 decides the cutting mode based on this direction.

In the lathe 21, after the radial infeed mode is automatically selected to start machining, the vibration sensor 18 detects vibrations both in the infeed direction and in the axial direction which are generated on the main spindle 2. The vibration-direction determining section 16 determines that the direction of larger vibrations is the direction in which vibrations are more likely to be generated. If vibrations are more likely to be generated in the infeed direction, the cutting-mode deciding section 17 selects the flank infeed mode or the alternate flank infeed mode. In either the flank infeed mode or the alternate flank infeed mode, the cutting width as viewed in the infeed direction is smaller and therefore the cut sectional area is less likely to vary, and the proportion of the infeed direction component (thrust force) to the combined cutting force is smaller as compared to the radial infeed mode. The cutting-mode deciding section 17 then changes the cutting mode from the radial infeed mode to the flank infeed mode or the alternate flank infeed mode to continue the machining. If vibrations are more likely to be generated in the axial direction, the cutting-mode deciding section 17 selects the radial infeed mode. In the radial infeed mode, the cutting width as viewed in the axial direction is smaller and therefore the cut sectional area is less likely to vary, and the proportion of the axial component (feed force) to the combined cutting force is smaller as compared to the flank infeed mode and the alternate flank infeed mode. The cutting-mode deciding section 17 then continues the machining without changing the cutting mode. If the cutting mode is changed, the third computing section 15 substitutes the number of remaining cutting operations for N rather than the total number of cutting operations. Then, the third computing section 15 calculates the main spindle rotation speed ss in the first pass after the change of the cutting mode by using the equations (2) to (4). Whether to select the flank infeed mode or the alternate flank infeed mode when changing the cutting mode may be preset by the operator, or may be automatically decided based on the machining program etc.

Advantages similar to those of the lathe 1 can be expected from this lathe 21. For example, even unskilled operators can easily suppress chatter vibrations, and cutting in the last tool pass at the low rotation speed can be reliably prevented.

The lathe 21 is provided with the vibration sensor 18 that detects vibrations generated on the main spindle 2, the vibration-direction determining section 16 that determines the direction in which vibrations are more likely to be generated, and the cutting-mode deciding section 17 that decides the cutting mode based on the direction in which vibrations are more likely to be generated. Thus, the cutting mode that is less likely to cause chatter vibrations is decided according to the direction in which vibrations are more likely to be generated, and machining is performed in this cutting mode. Therefore, chatter vibrations can be further suppressed.

The above embodiment and the modified embodiment are configured, for example, so that cutting in the last tool pass is performed at the high rotation speed. However, another modification may be configured so that cutting in a specific tool pass rather than the last tool pass is performed at the high rotation speed because chatter vibrations tend to be caused etc. In this case, N represents the pass in which cutting is desired to be performed at the high rotation speed (or the number of remaining cutting operations until this pass), and the main spindle rotation speed ss in the first pass (or the first pass after the change of the cutting mode) is calculated by using the equations (2) to (4).

The main spindle rotation speed may be changed in other patterns different from the patterns in the embodiment and the modified embodiment, based on the cutting mode or other machining conditions. For example, the main spindle rotation speed may be changed in every three passes, or cutting may be performed at the high rotation speed SH in two passes and at the low rotation speed SL in one pass.

Control of the threading process in the above embodiment and the modified embodiment is applicable to an internal threading process of a cylindrical portion etc. as well as an external threading process.

In the above embodiment and the modified embodiment, the three types of cutting modes, namely the radial infeed mode, the flank infeed mode, and the alternate flank infeed mode can be set as a cutting mode. However, other cutting modes may also be able to be set in the present invention. Alternatively, only two types of cutting modes including the alternate flank infeed mode may be able to be set in the present invention.

In the case where the cutting mode can be manually input and has been manually input in the modified embodiment, machining may be started by the input cutting mode rather than the radial infeed mode, or the cutting mode may not be changed.

Although the vibration sensor 18 is contained in the headstock 8 in the modified embodiment, the vibration sensor 18 may be placed on the tool rest 20 to detect vibrations generated on the workpiece 5.

The embodiment and the modified embodiment are described with respect to the lathe that rotates a workpiece as an embodiment of the machine tool. However, the present invention may be other machine tools such as a machining center that performs similar machining by relatively rotating a tool and a workpiece by a feed shaft rather than by rotation of the main spindle.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A machine tool, comprising:
   a holding device on which a shaft-shaped workpiece is mounted;
   a tool capable of moving in radial and axial directions of a workpiece with respect to the workpiece;
   a machining control unit that performs a threading process by repeating a tool pass in which the tool cuts the workpiece in the radial direction, moves in a direction parallel to an axis of the workpiece, and then moves away from the workpiece in the radial direction while the workpiece and the tool are relatively rotated about the axis of the workpiece;
   a rotation-speed control unit capable of changing a rotation speed on a tool pass basis; and
   a rotation-speed computing section that computes a relative rotation speed between the workpiece and the tool in every tool pass, wherein
   the rotation-speed control unit changes the rotation speed between a predetermined high rotation speed and a predetermined low rotation speed, the machine tool further comprising:
   a specific-rotation-speed computing section that decides whether the rotation speed in a first tool pass in the threading process should be at the predetermined high rotation speed or the predetermined low rotation speed based on a period with which the rotation speed is changed, a number of cutting operations in the period, and a number of sequential same rotation speed cutting passes that are performed before the rotation speed is changed so that cutting in a last tool pass is performed at the predetermined high rotation speed.

2. The machine tool according to claim 1, wherein
   the machining control unit is capable of performing the threading process in a plurality of types of cutting modes having different cutting methods of the tool, and a radial infeed mode, a flank infeed mode, and an alternate flank infeed mode are set as the cutting modes.

3. The machine tool according to claim 1, wherein
   the machining control unit is capable of performing the threading process in a plurality of types of cutting modes having different cutting methods of the tool, and a radial infeed mode, a flank infeed mode, and an alternate flank infeed mode are set as the cutting modes.

* * * * *